United States Patent
Ganu et al.

(10) Patent No.: US 12,313,747 B2
(45) Date of Patent: May 27, 2025

(54) AUTOMATIC LOCATION OF ACCESS POINTS IN A NETWORK

(71) Applicant: HEWLETT PACKARD ENTERPRISE DEVELOPMENT LP, Houston, TX (US)

(72) Inventors: Sachin Ganu, Santa Clara, CA (US); Charles Lukaszewski, Santa Clara, CA (US); Gaurav Patwardhan, Santa Clara, CA (US); Eldad Perahia, Park City, UT (US); Vikram Raghu, Santa Clara, CA (US); Stuart Walker Strickland, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 595 days.

(21) Appl. No.: 17/337,679

(22) Filed: Jun. 3, 2021

(65) Prior Publication Data
US 2022/0390614 A1  Dec. 8, 2022

(51) Int. Cl.
*G01S 19/14* (2010.01)
*G01S 19/46* (2010.01)
(Continued)

(52) U.S. Cl.
CPC .............. *G01S 19/14* (2013.01); *G01S 19/46* (2013.01); *H04W 4/023* (2013.01); *H04W 4/33* (2018.02); *H04W 24/08* (2013.01); *H04W 88/08* (2013.01)

(58) Field of Classification Search
CPC . G01S 19/14; G01S 19/46; G01S 5/01; G01S 5/0269; G01S 5/0289; G01S 19/51; G01S 19/48; G01S 19/42; G01S 13/878; G01S 5/14; G01S 5/0226; G01S 5/0036; G01S 1/042; G01S 5/02213; G01S 5/163; G01S 19/258; G01S 5/011; G01S 5/0221; G01S 5/0284; H04W 4/023; H04W 4/33; H04W 24/08; H04W 88/08; H04W 4/025; H04W 84/12; H04W 48/16; H04W 64/003; H04W 4/02; H04W 72/23; H04W 24/10;
(Continued)

(56) References Cited

U.S. PATENT DOCUMENTS 9,042,917 B2  5/2015  Edge
9,220,081 B2  12/2015  Prechner et al.
(Continued)

FOREIGN PATENT DOCUMENTS

CN  110267202  9/2019
WO  WO-2019034240 A1 *  2/2019  ........... G01C 21/206

*Primary Examiner* — Alison Slater
*Assistant Examiner* — Jing Gao
(74) *Attorney, Agent, or Firm* — Hewlett Packard Enterprise Patent Department

(57) ABSTRACT

Examples described herein provide automatic location of access points by a computing device. Examples may include receiving, by the computing device from each AP in a subset of a plurality of APs, a Global Navigation Satellite System (GNSS) signal measurement, and based on each received GNSS signal measurement, constraining, by the computing device, the map of relative AP locations by at least one translational degree of freedom or one rotational degree of freedom. Examples may include resolving, by the computing device, locations of the plurality of APs in the map of relative AP locations.

21 Claims, 8 Drawing Sheets

(51) Int. Cl.
*H04W 4/02* (2018.01)
*H04W 4/33* (2018.01)
*H04W 24/08* (2009.01)
*H04W 88/08* (2009.01)

(58) Field of Classification Search
CPC ... H04W 24/02; H04W 4/029; H04W 74/006; H04W 64/00; H04W 4/50; H04W 72/542; H04W 72/54; H04W 4/021; H04W 48/20; H04W 12/63; H04W 28/0861; H04W 88/12; H04W 24/00; H04W 36/30; H04W 52/245; H04W 92/10; H04W 92/20; H04W 16/18; H04W 28/0835; H04W 28/0862
See application file for complete search history.

(56) References Cited

U.S. PATENT DOCUMENTS

| | | | |
|---|---|---|---|
| 10,477,349 B2 | 11/2019 | Sinha et al. | |
| 10,659,921 B2 | 5/2020 | Venkatraman et al. | |
| 2003/0162552 A1* | 8/2003 | Lehtinen | G01S 19/42 342/357.35 |
| 2011/0187591 A1* | 8/2011 | Walker, Sr. | G01S 19/46 342/357.29 |
| 2012/0306693 A1* | 12/2012 | Edge | H04W 64/003 342/357.29 |
| 2015/0369924 A1* | 12/2015 | Hedgecock | G01S 19/51 342/357.34 |
| 2018/0091949 A1* | 3/2018 | Steiner | H04W 4/027 |
| 2022/0377752 A1* | 11/2022 | Zhbankov | G01S 5/0263 |

* cited by examiner

AUTOMATIC LOCATION OF ACCESS POINTS IN A NETWORK

BACKGROUND

The deployment of multiple access points (APs) in a large facility is a complex undertaking. The deployment requires balancing of numerous factors in determining the best location of each of a large number of access points. Further, the planned placement of the access points may require modification as new conditions are discovered or as changes occur within the facility.

Further, once the access points are installed, later determining the precise location of each access point for servicing or replacement can be challenging. The access points may be well hidden behind walls, ceilings, and other structures, thus requiring that the access points be located based upon recorded information or through a search process.

For example, the location of access points may be determined based on an access point map if such map exists. However, generation of an access point map is difficult and labor-intensive, and the map may be inaccurate or out of date when the map is actually needed.

If a map of access points is unavailable or is unhelpful because of inaccuracy, then the determination of the location of access points may require alternate search means, such as use of a wireless sniffer or spectrum analyzer. A search for access points in this manner is extremely time consuming and may not be helpful if an access point has failed, or if a particular signal is difficult to detect and track.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
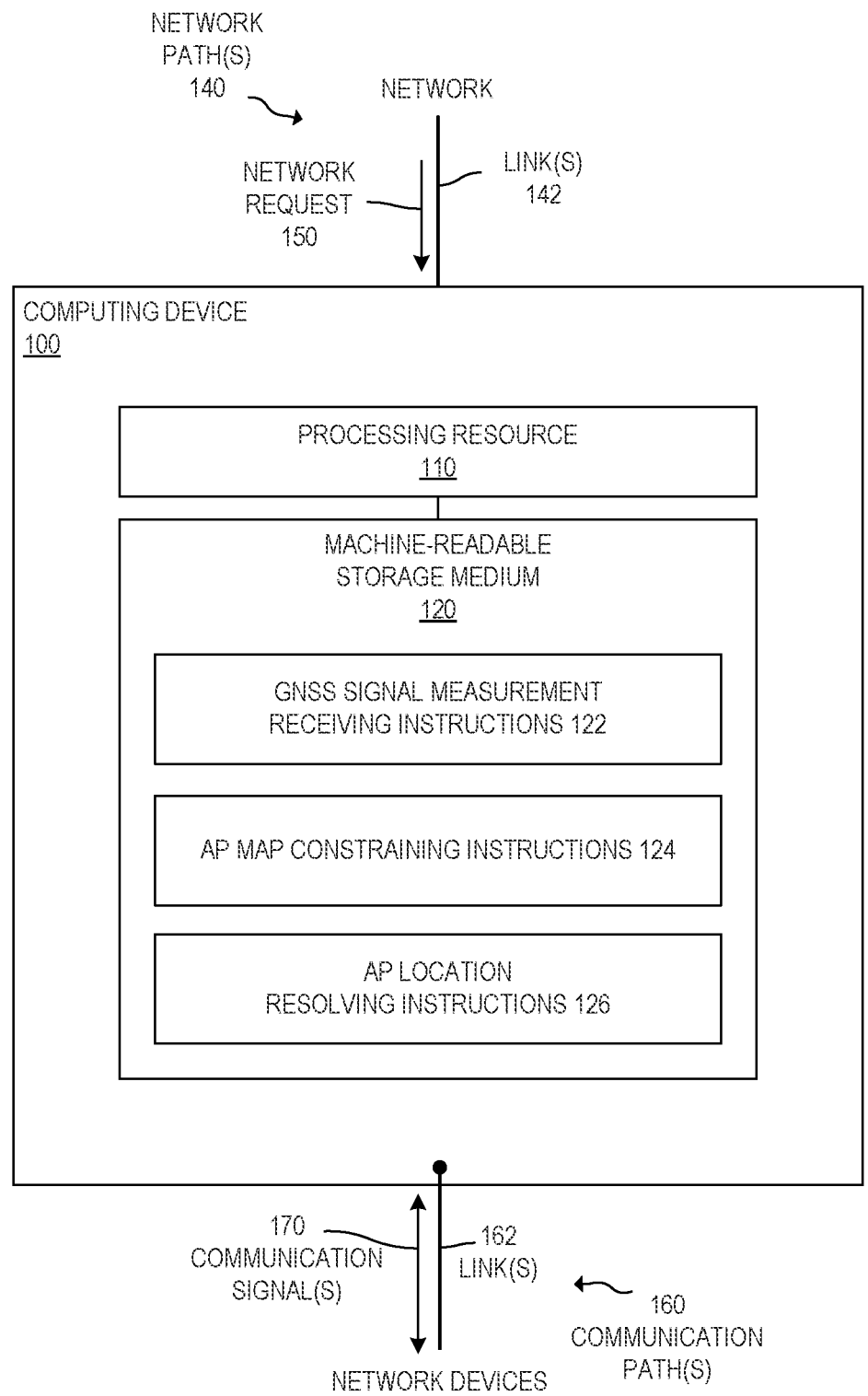
FIG. 1 is a block diagram of an example computing device for providing automatic location of access points in a network.

Recently, there have been efforts to generate maps of access point locations in a network by using one or more actual known locations of access points. Such known access points may be referred to as anchor points, and the location of at least three anchor points is generally required to resolve the locations of the access points in 3D space. For instance, when a network includes access points, some of whose locations have been manually surveyed and recorded, these manually surveyed access points may be used as anchor points.

However, manual determination of individual access point locations is subject to limitations and errors. For instance, anchor point locations may be improperly entered, anchor points may be moved, or removed from service. Errors in anchor point locations greatly impact the effectiveness of efforts to generate and maintain accurate AP location information across a deployment. Furthermore, while manually locating individual anchor points is labor intensive and error prone, increasing the density of accurately located anchor points greatly improves the overall accuracy of all AP locations.

In a network that includes access points equipped with Global Navigation Satellite (GNSS) receivers, such GNSS-capable access points may determine their own location from GNSS data and may be established as anchor points. However, access points equipped with GNSS receivers may not have sufficient visibility of satellite signals to independently establish their locations. Errors in GNSS measurements may be compounded in location estimates of other access points that rely upon them as anchor points.

To address these issues, examples described herein provide automatic location of access points in a network. Examples described herein may receive, by a computing device from each AP in a subset of a plurality of APs, a GNSS signal measurement, and based on each received GNSS signal measurement, constrain, by the computing device, a map of relative AP locations (i.e., AP map) by at least one translational degree of freedom or one rotational degree of freedom. Examples described herein may resolve, by the computing device, locations of the plurality of APs in the AP map.

In this manner, examples described herein provide automatic location of access points in a network. For instance, in examples described herein, a computing device may receive GNSS signal measurements from a subset of APs (GNSS-capable APs), and based on each received GNSS signal measurement, constrain the AP map by at least one translational degree of freedom or one rotational degree of freedom, thereby increasing the reliability of such GNSS-capable APs as anchor points in the AP map. Further, in examples described herein, a computing device may resolve locations of the plurality of APs in the AP map, thereby providing automatic location of access points in the network without the same limitations and errors that arise, for example, when there is insufficient visibility of satellite signals to independently and accurately establish GNSS-capable APs as anchor points.

Referring now to the drawings, FIG. 1 is a block diagram of an example computing device 100 for automatic location of APs. Computing device 100 includes at least one processing resource 110 and at least one machine-readable storage medium 120 comprising (e.g., encoded with) at least GNSS signal measurement receiving instructions 122, AP map constraining instructions 124, and AP location resolving instructions 126.

In the example of FIG. 1, computing device 100 may include a device to communicate with a plurality of APs in a network to perform automatic location of such APs. For instance, computing device 100 may comprise a gateway router, a wireless local area network (WLAN) controller, a switch, a server, or a combination thereof. In some examples, computing device 100 may comprise an AP that is configured to communicate with the plurality of APs in the network.

In the example of FIG. 1, computing device 100 may engage in any network data transmission operations, including, but not limited to, switching, routing, bridging, or a combination thereof. Moreover, computing device 100 may gather network operating information from various nodes of one or more networks, including network traffic load information, network topology information, network usage information, etc. Furthermore, computing device 100 may transmit commands to various nodes of the one or more networks to alter network topology and routing to achieve various network efficiency and efficacy goals. It will be understood that computing device 100 may comprise any suitable type(s) of computing device(s) for performing automatic location of APs in a network. Moreover, computing device 100 may include any necessary hardware components to perform the inventions disclosed herein, including, but not limited to: processors, memories, display devices, input devices, communications equipment, etc.

In the example of FIG. 1, computing device 100 may be configured (e.g., encoded with instructions executable by at least one processing resource 110) to receive network request(s) 150 from a network via network path(s) 140. Network path(s) 140 may include any suitable link(s) 142 (e.g., wired or wireless, direct or indirect, etc.) between computing device 100 and a network. Network request(s) 150 may include any suitable instructions to instruct compute device 100 to perform automatic location of APs in a network. For instance, network request(s) 150 may include instructions to instruct computing device 100 to perform GNSS signal measurement receiving instructions 122, AP map constraining instructions 124, and AP location resolving instructions 126.

In examples described herein, a "network path" may include a combination of hardware (e.g., interfaces, links, etc.) and instructions (e.g., executable by a processing resource) to communicate (e.g., receive, send) a command (e.g., network request 150) to an external resource (e.g., server, cloud computing resource, etc.) connected to the network.

In the example of FIG. 1, computing device 100 may be configured (e.g., encoded with instructions executable by at least one processing resource 110) to send or receive communication signal(s) 170 via communication path(s) 160 to perform automatic location of APs in a network. Communication(s) 160 may include any suitable link(s) 162 (e.g., wired or wireless, direct or indirect, etc.) between computing device 100 and one or more network devices. Communication signal(s) 170 may include any suitable instructions for computing device 100 to perform automatic location of access points in a network (e.g., for computing device 100 to perform GNSS signal measurement receiving instructions 122, AP map constraining instructions 124, and AP location resolving instructions 126).

In examples described herein, a "communication path" may include a combination of hardware (e.g., interfaces, links, etc.) and instructions (e.g., executable by a processing resource) to communicate (e.g., receive, send) a command with one or more network devices.

Figure 3:
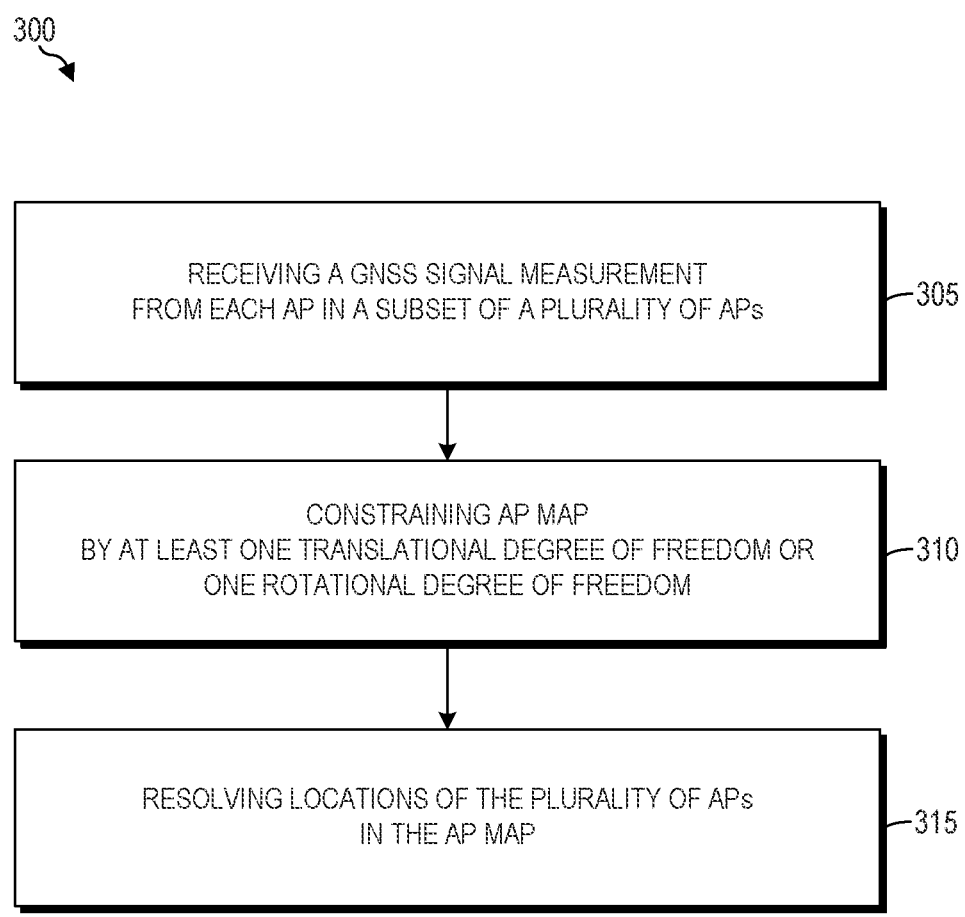
FIG. 3 is a flowchart of an example method for providing automatic location of access points in a network.

FIG. 3 is a flowchart of an example method 300 for automatic location of APs. Although execution of method 300 is described below with reference to computing device 100, other computing devices suitable for the execution of method 300 may be utilized. Additionally, implementation of method 300 is not limited to such examples. While only three blocks are shown in method 300, method 300 may include other actions described herein. Additionally, although the blocks are shown in an order, blocks depicted in FIG. 3 may be performed in any suitable order and at any time. Moreover, one or more of blocks of method 300 may be performed in combination with one or more blocks of methods 400, 500, 600, or 700. Also, some of the blocks shown in method 300 may be omitted without departing from the spirit and scope of this disclosure.

In the example of FIG. 3, at block 305, GNSS signal measurement receiving instructions 122, when executed by processing resource 110, receive, from each AP in a subset of a plurality of APs, a GNSS signal measurement. The GNSS signal measurement received by computing device 100 from an AP may indicate one or more metrics or parameters of GNSS signal(s) received by the AP. For instance, the GNSS signal measurement may indicate a GNSS type (e.g., Global Positioning System, Global Navigation Satellite System, Galileo, etc.), signal strength (e.g., in decibels), frequency, bandwidth, data rate, modulation scheme (e.g., Binary Phase Shift Keying modulation), receiver noise, multipath interference, free-space path loss (SPFL), atmospheric attenuation, depolarization loss, Doppler offset, code-division multiple access (CDMA) pseudo random noise (PN) offset, carrier phase, or a combination thereof, of one or more GNSS signals received by the AP. Moreover, a GNSS signal measurement received by computing device 100 from an AP may indicate a dilution of precision (DOP) or satellite geometry of signals used in estimating a position for the AP. Based on the DOP or satellite geometry of signals used in estimating the position for the AP, computing device 100 may determine a level of error in the estimated position of the AP and azimuths and elevations that are visible to the AP, which in turn, may reveal information about where the AP is located within a structure (e.g., building) whose boundaries and materials are known. It will be understood that the received GNSS signal measurement may include other suitable type(s) of metrics or parameters of GNSS signal(s) received by the AP. Computing device 100 may receive the GNSS signal measurement from each AP via communication path(s) 160 between computing device 100 and the AP.

In the example of FIG. 3, based on each received GNSS signal measurement, at block 310, AP map constraining instructions 124, when executed by processing resource 110, constrain a map of relative AP locations (i.e., AP map or AP constellation) by at least one translational degree of freedom or one rotational degree of freedom. As used herein, a "map of relative AP locations", "AP map", or "AP constellation" refers to a set of location estimates for the plurality of APs based on a relative framework (e.g., based on estimated distances between each of the APs), and may possess up to three translational degrees of freedom and three rotational degrees of freedom. In some examples, computing device 100 may be configured to generate the map of relative AP locations. Alternatively, computing device may be configured to receive the map of relative AP locations from an external source (e.g., from a network via network path 140).

In addition, at block 310, AP map constraining instructions 124 may comprise instructions to determine, for each AP in the subset of APs, whether the GNSS signal measurement received from the AP satisfies a signal measurement criteria. As used herein, a "signal measurement criteria" refers to one or more threshold metrics or parameters of one or more received GNSS signals. The signal measurement criteria may correspond to a threshold minimum value, a threshold maximum value, an acceptable range of values, etc., for one or more metrics or parameters of one or more received GNSS signals. For instance, the signal measurement criteria may be based on whether the AP is able to receive a GNSS signal and calculate a location estimate for the AP (i.e., determine a GNSS fix), a time for the AP to determine a GNSS fix, a number and geometric distribution of received GNSS signals by the AP which are used to calculate a location estimate of the AP, an estimate of the effect(s) of multipath propagation on individual signal measurements of received GNSS signals by the AP, or a combination thereof.

At block 310, based on a determination that for each of at least one AP in the subset of APs, the GNSS signal measurement received from the AP satisfies the signal measurement criteria, AP map constraining instructions 124 may comprise instructions to constrain the map of relative AP locations by three translational degrees of freedom (by establishing at least one AP in the subset of APs as an anchor point). Based on a determination that for each of at least two APs in the subset of APs, the GNSS signal measurement received from the AP satisfies the signal measurement criteria, AP map constraining instructions 124 may comprise instructions to constrain the map of relative AP locations by three translational degrees of freedom and two rotational degrees of freedom (by establishing at least two APs in the subset of APs as anchor points). Based on a determination that for each of at least three APs in the subset of APs, the GNSS signal measurement received from the AP satisfies the signal measurement criteria, AP map constraining instructions 124 may comprise instructions to constrain the map of relative AP locations by three translational degrees of freedom and three rotational degrees of freedom (by establishing at least three APs in the subset of APs as anchor points). In examples described herein, the map of relative AP locations may be constrained by a translational degree of freedom by precluding location estimates for one or more of the plurality of APs that lie within a given translational axis. In examples described herein, the map of relative AP locations may be constrained by a rotational degree of freedom by precluding location estimates for one or more of the plurality of APs that lie within a given rotational axis.

In the example of FIG. 3, at block 315, AP location resolving instructions 126, when executed by processing resource 110, resolve locations of the plurality of APs in the map of relative AP locations. Resolving the locations of the plurality of APs may comprise assigning a set of locations for each of the plurality of APs based on a global reference framework. The set of locations may be in accordance with a geographic coordinate system (GCS). For instance, each location estimate may be represented as a set of spherical coordinates (latitude, longitude, elevation), map coordinates projected onto a plane, as earth-centered, earth-fixed (ECEF) Cartesian coordinates in 3-space (e.g., according to the World Geodetic System 84), location coordinates (degrees, minutes, seconds) that are in relation to one or more known reference points (e.g., one or more of the plurality of APs, one or more other objects, etc.), as a set of numbers, letters, or symbols forming a geocode, or the like, or a combination thereof. As used herein, a "geocode" is a code that represents a geographic entity (location or object), and is a unique identifier of the entity which distinguishes it from others in a finite set of geographic entities.

In the example of FIG. 3, at block 315, AP location resolving instructions 126 may comprise instructions to receive a local measurement (e.g., first local measurement) between at least two APs in the subset of APs, wherein the local measurement comprises a fine time measurement (FTM). For instance, the local measurement may comprise multi-dimensional scaling (MDS) applied to FTMs between at least two APs in the subset of APs. Based on the local measurement, AP location resolving instructions 126 may comprise instructions to determine location estimates (e.g., first location estimates) for the plurality of APs. In addition, AP location resolving instructions 126 may comprise instructions to determine whether the location estimates for the plurality of APs satisfy a location accuracy threshold. As used herein, a "location accuracy threshold" refers to a threshold level of certainty in one or more location estimates for the plurality of APs. For instance, the location accuracy threshold may be based on a probability of the accuracy of one or more location estimates of the plurality of APs. In some examples, the location accuracy threshold may be based on a DOP or satellite geometry of signals used in estimating the location estimates for the plurality of APs, estimated multipath effects on the location estimates for the plurality of APs, a convergence or distribution of multiple measurements taken over time by one or more of the plurality of APs, or a combination thereof. In some examples, the location accuracy threshold may be based on a consistency of the location estimates (based on one or more received GNSS measurements) with known information about the environment, such as building boundaries, outside of which, for example, the AP cannot lie. In some examples, the location accuracy threshold may be based on a consistency of the location estimates of the APs based on one or more received GNSS measurements with location estimates based on other measurements, such as ranging or angular measurements among APs. For instance, computing device 100 may determine whether a location estimate for an AP satisfies the location estimate threshold by computing a difference between (i) an initial location estimate for the AP based on received GNSS measurements from the AP (i.e., based on a determined GNSS fix) and (ii) an adjusted location estimate (e.g., first location estimate) for the AP based on MDS applied to FTMs between the AP and another AP in the subset of APs. Based on a determination that the difference between (i) and (ii) satisfies (e.g., exceeds) a threshold level of difference, computing device 100 may determine that the location estimate for the AP does not satisfy the location estimate threshold. Moreover, based on a determination that the difference between (i) and (ii) does not satisfy the threshold level of difference, computing device 100 may determine that the location estimate for the AP satisfies the location estimate threshold.

Based on (e.g., in response to) a determination that the location estimates for the plurality of APs do not satisfy the location accuracy threshold, AP location resolving instructions 126 may comprise instructions to determine subsequent location estimates (e.g., second location estimates) for the plurality of APs. Each subsequent location estimate may comprise a geographic coordinate, for instance, location coordinates (degrees, minutes, seconds) that are in relation to a estimated location of one or more of the plurality of APs, an estimated location of another object, or a location of a known reference point (e.g., anchor point). In some examples, computing device 100 may determine subsequent location estimates for the plurality of APs by constraining the map of relative AP locations (in a manner as described above) while removing one or more APs in the subset of APs from consideration as anchor points. For instance, computing device 100 may remove from consideration as an anchor point each AP in the subset of APs for which there is a threshold level of difference between (i) an initial location estimate for the AP based on received GNSS measurements from the AP (i.e, based on a determined GNSS fix) and (ii) an adjusted location estimate (e.g., first location estimate)

for the AP based on MDS applied to FTMs between the AP and another AP in the subset of APs.

In the example of FIG. 3, at block 310, AP map constraining instructions 124 may comprise instructions to receive a subsequent local measurement (e.g., second local measurement) between at least two APs of the plurality of APs. The subsequent local measurement may comprise an FTM, a received signal strength indicator (RSSI) measurement, an angle-of-arrival (AoA) measurement, a short guard interval (SGI) measurement, a long guard interval (LGI) measurement, channel state information (CSI), or a combination thereof, between at least two APs of the plurality of APs. For example, computing device 100 may utilize an RSSI measurement, SGI measurement, LGI measurement, angular information of Wi-Fi, or other signals with error sources orthogonal to FTM errors, or a combination thereof, to identify and filter erroneous non-line of sight (NLOS) FTM measurements between at least two APs of the plurality of APs. In another example, computing device 100 may determine that FTM measurements between at least two APs of the plurality of APs are affected by multi-path reflections based on identifying a mismatch between high RSSI measurement values and long FTM range values between the at least two APs, and assign a lighter weighting factor to such FTM measurements as compared to one or more other FTM measurements. For instance, computing device 100 may identify an FTM measurement between two APs of the plurality of APs which is affected by multi-path reflections, and assign a weighting factor of zero to such FTM measurement (i.e., eliminate such FTM measurement from consideration) when determining location estimates for the plurality of APs. In another example, computing device 100 may utilize an AoA measurement between at least two APs of the plurality of APs, or derive relative angles of received signals from CSI between at least two APs of the plurality of APs, to construct and resolve an angle matrix to determine location estimates of the plurality of APs.

In the example of FIG. 3, at block 310, based on the subsequent local measurement, AP map constraining instructions 124 may comprise instructions to constrain the map of relative AP locations to probable locations of the subset of APs. As used herein, "probable locations of the subset of APs" may refer to location estimate(s) for each AP in the subset of APs that precludes impossible or unlikely location estimate(s) for each AP. In other words, as used herein, "probable locations of the subset of APs" may refer to location estimate(s) for each AP in the subset of APs that includes likely location estimate(s) for each AP. A location estimate for an AP may be considered to be impossible when there is a zero percent probability or substantially zero percent probability (e.g., ≥0.1%) that the AP is located there. A location estimate for an AP may be considered to be unlikely when there is a low probability (≤5 percent, ≤1 percent, ≤0.5 percent, etc.) that the AP is located there. Alternatively, or in addition, a location estimate for an AP may be considered to be unlikely when there is a less than moderate probability (e.g., ≥40 percent, >50 percent, etc.) that the AP is located there. A location estimate for an AP may be considered to be likely when there is a moderate to high probability (≥50%, ≥80%, ≥95%, ≥99%, etc.) that the AP is located there. It will be understood that the probable locations of the subset of APs may be determined by precluding impossible or unlikely location estimates according to any suitable probability threshold (e.g., ≤25 percent, ≤10 percent, etc.), by including likely estimates according to any suitable probability threshold (≥80%, ≥95%, ≥99%, etc.), or a combination thereof. At block 315, based on (e.g., in response to) constraining the map of relative AP locations to the probable locations of the subset of APs, AP location resolving instructions 126 may comprise instructions to determine the subsequent location estimates for the plurality of APs.

In the example of FIG. 3, at block 310, AP map constraining instructions 124 may comprise instructions to receive a subsequent local measurement (e.g., second local measurement) for each of at least one AP in the subset of APs. For instance, the subsequent local measurement may comprise a barometric pressure measurement of the AP. The pressure measurement for each AP may be performed by a calibrated pressure sensor (i.e., where the elevation of the AP is predetermined), or an uncalibrated pressure sensor. Based on the subsequent local measurement, AP map constraining instructions 124 may comprise instructions to constrain the map of relative AP locations to probable locations of the subset of APs. At block 315, based on (e.g., in response to) constraining the map of relative AP locations to the probable locations of the subset of APs, AP location resolving instructions 126 may comprise instructions to determine the subsequent location estimates for the plurality of APs.

In the example of FIG. 3, at block 310, AP map constraining instructions 124 may comprise instructions to determine building floor level information for the plurality of APs. The building floor level information for the plurality of APs may include a floor level for one or more of the plurality of APs, which may be used to infer that one or more of the plurality of APs are co-planar with each other. Determining the building floor level information for the plurality of APs may comprise instructions to receive a local measurement (e.g., first local measurement) between at least one AP in the subset of APs and at least one other AP of the plurality of APs. For instance, the local measurement may comprise an FTM, a RSSI measurement, an AoA measurement, or a combination thereof, between at least one AP in the subset of APs and another AP of the plurality of APs, wherein such measurement(s) may be used to infer that one or more of the plurality of APs are co-planar with each other. Alternatively, or in addition, the instructions to determine the building floor level information for the plurality of APs may comprise instructions to receive a local measurement (e.g., first local measurement) for at least one AP in the subset of APs. For instance, the local measurement may comprise a building entry loss measurement, a pressure measurement, or a combination thereof, for at least one AP in the subset of APs, wherein such measurement(s) may be used to infer that one or more of the plurality of APs are co-planar with each other. Based on the local measurement (e.g., which may comprise one or more of the above-described local measurements), AP map constraining instructions 124 may comprise instructions to determine the building floor level information for the plurality of APs. Based on the building floor level information, AP map constraining instructions 124 may comprise instructions to constrain the map of relative AP locations by at least one rotational degree of freedom. Specifically, the building floor level information for the plurality of APs may be used to infer that one or more APs are co-planar with each other, and may thereby be used to eliminate at least one rotational degree of freedom in the map of relative AP locations.

In the example of FIG. 3, at block 310, AP map constraining instructions 124 may comprise instructions to determine building floor plan information for the plurality of APs. The building floor plan information for the plurality of APs may comprise a map of one or more floor plans of one or more buildings in which the plurality of APs are located. For example, the building floor plan information may comprise a graphical representation of the floor plan(s) of the building(s), such as a computer aided design (CAD) rendering of the floor plan(s). Based on the building floor plan information, AP map constraining instructions 124 may comprise instructions to constrain the map of relative AP locations to probable locations of the plurality of APs. Specifically, the building floor plan information may be transposed to the map of relative AP locations, and the probable locations of the plurality of APs may be determined by precluding impossible or unlikely location estimates for each AP that would place the AP outside of the boundaries of the building floor plan information, including likely location estimates for each AP that would place the AP inside the boundaries of the building floor plan, or a combination thereof.

In the example of FIG. 3, at block 310, based on a determination that for each AP in the subset of APs, the GNSS signal measurement received from the AP does not satisfy the signal measurement criteria, AP map constraining instructions 124 may comprise instructions to determine a derived measurement from the GNSS measurement received from each AP in the subset of APs. For instance, the derived measurement may comprise satellite orbital information, a building entry loss estimate, a received power, or a combination thereof, which are derived from the received GNSS signal measurement from an AP. Moreover, AP map constraining instructions 124 may comprise instructions to constrain the map of relative AP locations to probable locations of the subset of APs by combining geospatial building footprint information with the derived measurement. As used herein, "geospatial building footprint information" refers to location information received from a GNSS which may be used to infer boundaries of one or more buildings in which the plurality of APs are located. At block 315, based on (e.g., in response to) constraining the possible locations of the subset of APs, AP location resolving instructions 126 may comprise instructions to determine the location estimates (e.g., first location estimates) for the plurality of APs. For instance, when the derived measurement comprises a building entry loss estimate, it may be inferred that there is generally lower building entry loss at locations at the periphery of the buildings (e.g., near windows), where signals may not be obstructed by known adjacent structures. Thus, the building entry loss estimate may be used to preclude location estimates for each AP where the corresponding building entry loss measurement for the AP would be impossible or unlikely, to include location estimates for each AP where the corresponding building entry loss measurement would be likely, or a combination thereof.

In this manner, example computing device 100 of FIG. 1 (and method 300 of FIG. 3) provides automatic location of access points in a network. For instance, computing device 100 may receive GNSS signal measurements from a subset of GNSS-capable APs (at block 305), and based on each received GNSS signal measurement, constrain a map of relative AP locations by at least one translational degree of freedom or one rotational degree of freedom (at block 310), thereby increasing the reliability of anchor points in the map of relative AP locations. Further, computing device 100 may resolve locations of the plurality of APs in the map of relative AP locations (at block 315), thereby providing automatic location of access points in the network without the same limitations and errors that arise, for example, when there is insufficient visibility of satellite signals to independently and accurately establish GNSS-capable APs as anchor points.

Figure 2:
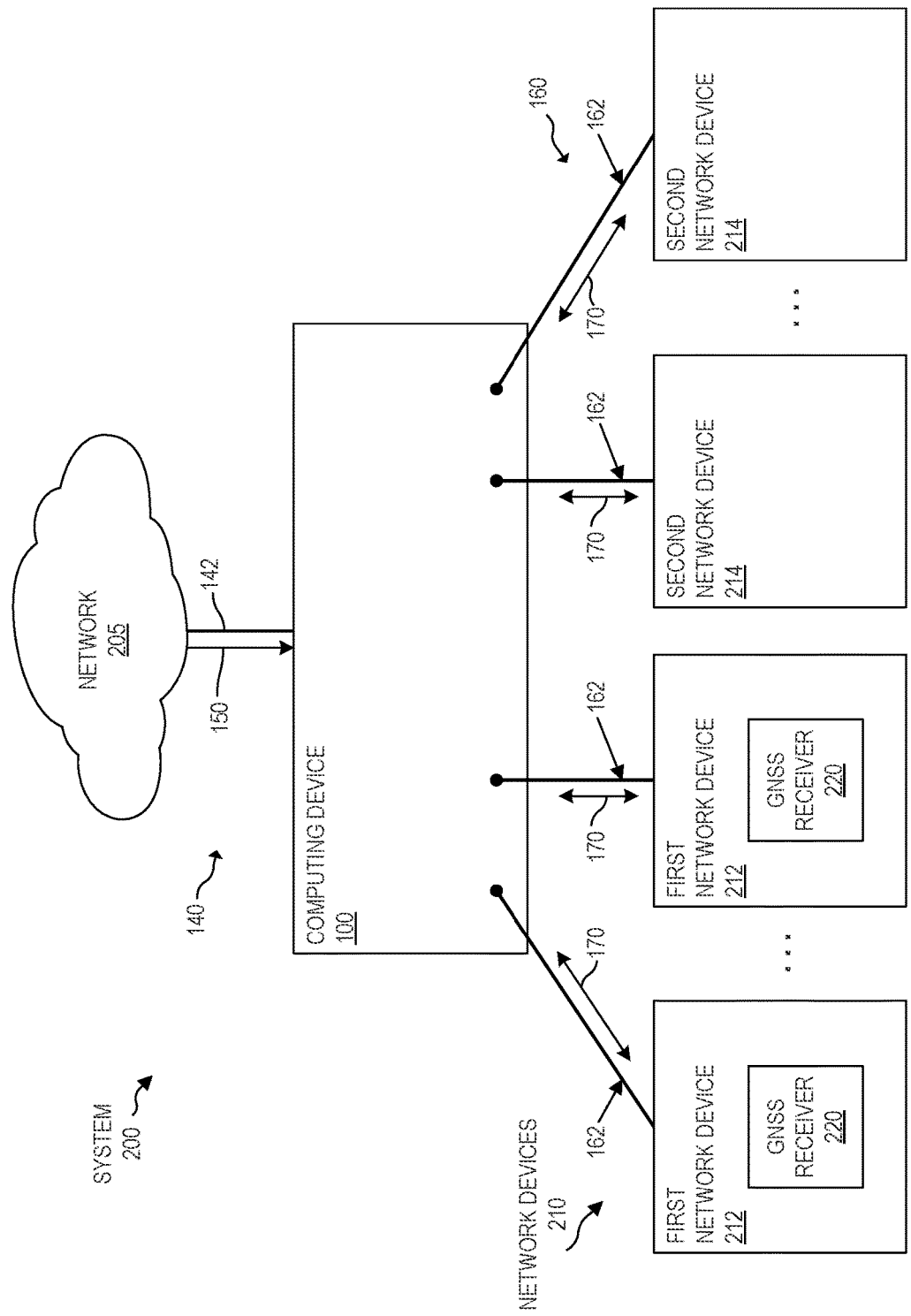
FIG. 2 shows a block diagram for an example system for providing automatic location of access points in a network.

FIG. 2 is a block diagram of an example system 200 including a computing device for automatic location of APs. System 200 includes computing device 100 as described above in relation to FIG. 1. In addition, system 200 comprises a network 205 and a plurality of network devices 210. Network devices 210 include a plurality of first network devices 212 (i.e., a subset of the plurality of network devices 210), and a plurality of second network devices 214. Although FIG. 2 shows that two first network devices 212 and two second network devices 214 are connected to network 205 via computing device 100, it will be understood that any suitable number of first network devices 212 and any suitable number of second network devices 214 may be connected to network 205.

In the example of FIG. 2, network 205 may comprise one or more local area networks (LANs), virtual LANs (VLANs), wireless local area networks (WLANs), virtual private networks (VPNs), wide area networks (WANs), the Internet, or the like, or a combination thereof. As used herein, a "wide area network" or "WAN" may comprise, for example, a wired WAN, wireless WAN, hybrid WAN, software-defined WAN (SD-WAN), or a combination thereof. In addition, network 205 may comprise one or more cellular networks using one or more mobile communications standards (e.g., 3G, 4G, 5G, etc.). It will be understood that system 200 may comprise any suitable type(s) of network(s) 205. Moreover, although FIG. 2 shows that a single computing device 100 is connected to network 205, it will be understood that any suitable number of computing devices (in addition to computing device 100) may be connected to network 205.

In the example of FIG. 2, each first network device 212 includes a GNSS receiver 220 (i.e., each first network device 212 is a GNSS-capable network device). In addition, each first network device 212 includes a radio (not shown) to communicate with computing device 100, one or more other first network devices 212, one or more second network devices 214, or a combination thereof. Similarly, each second network device 214 comprises a radio (not shown) to communicate with computing device 100, one or more first network devices 212, one or more other second network devices 214, or a combination thereof. The radio(s) may generate a signal in one or more frequency bands, process a signal in one or more frequency bands, or a combination thereof. The radio(s) of network devices 210 may operate at any suitable frequency band(s) and conform to any suitable type(s) of wireless communication standards, now known and later developed. For instance, one or more radios of network devices 210 may operate at one or more channels in the 2.4 GHz band and/or 5 GHz band, in accordance with the IEEE 802.11ac and/or 802.11ax standards. Moreover, each of network devices 210 may each include one, two, or any other suitable number(s) of radios.

In the example of FIG. 2, computing device 100 may be configured to receive network request(s) 150 via a network path(s) 140 to establish communication with one or more of network devices 210. For instance, computing device 100 may receive a signal from network 205 containing network request 150. Network request(s) 150 may include any suitable instructions to instruct computing device 100 to establish communication with one or more network devices 210 (e.g., to perform at least GNSS signal measurement receiving instructions 122, AP map constraining instructions 124, and AP location resolving instructions 126 as described herein.)

In the example of FIG. 2, computing device 100 may be configured to send or receive communication signal(s) 170 via communication path(s) 160 to establish communication with one or more network devices 210. Communication path(s) 160 may include any suitable communication link(s) 162 between computing device 100 and network devices 210. For instance, computing device 100 may transmit a communication signal 170 to one or more radios of first network devices 212 and one or more radios of second network devices 214, and receive a communication signal 170 from one or more radios of first network devices 212 and one or more radios of second network devices 214. Communication signal(s) 170 may include any suitable instructions to instruct computing device 100 to establish communication with one or more network devices 210 (e.g., to perform at least GNSS signal measurement receiving instructions 122, AP map constraining instructions 124, and AP location resolving instructions 126 as described herein.)

In the example of FIG. 2, network devices 210 may engage in any network data transmission operations, including, but not limited to, switching, routing, bridging, or a combination thereof. In addition, one or more network devices 210 may comprise a wireless access point (WAP). In examples described herein, a "WAP" generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood that network devices 210 may include any suitable type(s) of network device(s) made by any suitable manufacturer(s). Moreover, one or more network devices 210 may comprise a client device. In examples described herein, a client device may comprise a laptop computer, a desktop computer, a mobile device, and/or other wireless devices, although examples of the disclosure are not limited to such devices. In examples described herein, a "mobile device" refers to a device that is (or may be) carried and/or worn by a user. For instance, a mobile device can be a phone (e.g., a smartphone), a tablet, a personal digital assistant (PDA), smart glasses, and/or a wrist-worn device (e.g., a smartwatch), among other types of mobile devices.

In the example of FIG. 2, computing device 100 is configured to (e.g., encoded with non-transitory machine-readable instructions executable by at least one processing resource 100) to perform GNSS signal measurement receiving instructions 122, AP map constraining instructions 124, and AP location resolving instructions 126, as described above in relation to FIG. 1. For instance, computing device 100 is configured to receive, from each of first network devices 212 (i.e., a subset of the plurality of network devices 210), a GNSS signal measurement. In addition, based on each received GNSS signal measurement, computing device 100 is configured to constrain a map of relative AP locations by at least one translational degree of freedom or one rotational degree of freedom. Moreover, computing device 100 is configured to resolve locations of network devices 210 in the map of relative AP locations.

In the example of FIG. 2, each first network device 212 may be configured (e.g., encoded with non-transitory machine-readable instructions executable by at least one processing resource) to receive, by GNSS receiver 220, a GNSS signal from a satellite. Based on (e.g., in response to) the received GNSS signal, first network device 212 may be configured to determine a GNSS signal measurement for the first network device 212. In addition, first network device 212 may be configured to transmit, to computing device 100, the GNSS signal measurement for first network device 212.

In this manner, example system 200 of FIG. 2 provides automatic location of access points in a network. For instance, computing device 100 may receive GNSS signal measurements from first network devices 212 (GNSS-capable APs), and based on each received GNSS signal measurement, constrain a map of relative AP locations by at least one translational degree of freedom or one rotational degree of freedom, thereby increasing the reliability of one or more first network devices 212 as anchor points in the map of relative AP locations. Further, computing device 100 may resolve locations of network devices 210 in the map of relative AP locations, thereby providing automatic location of APs in the network without the same limitations and errors that arise, for example, when there is insufficient visibility of satellite signals to independently and accurately establish one or more first network devices 212 as anchor points.

Figure 4:
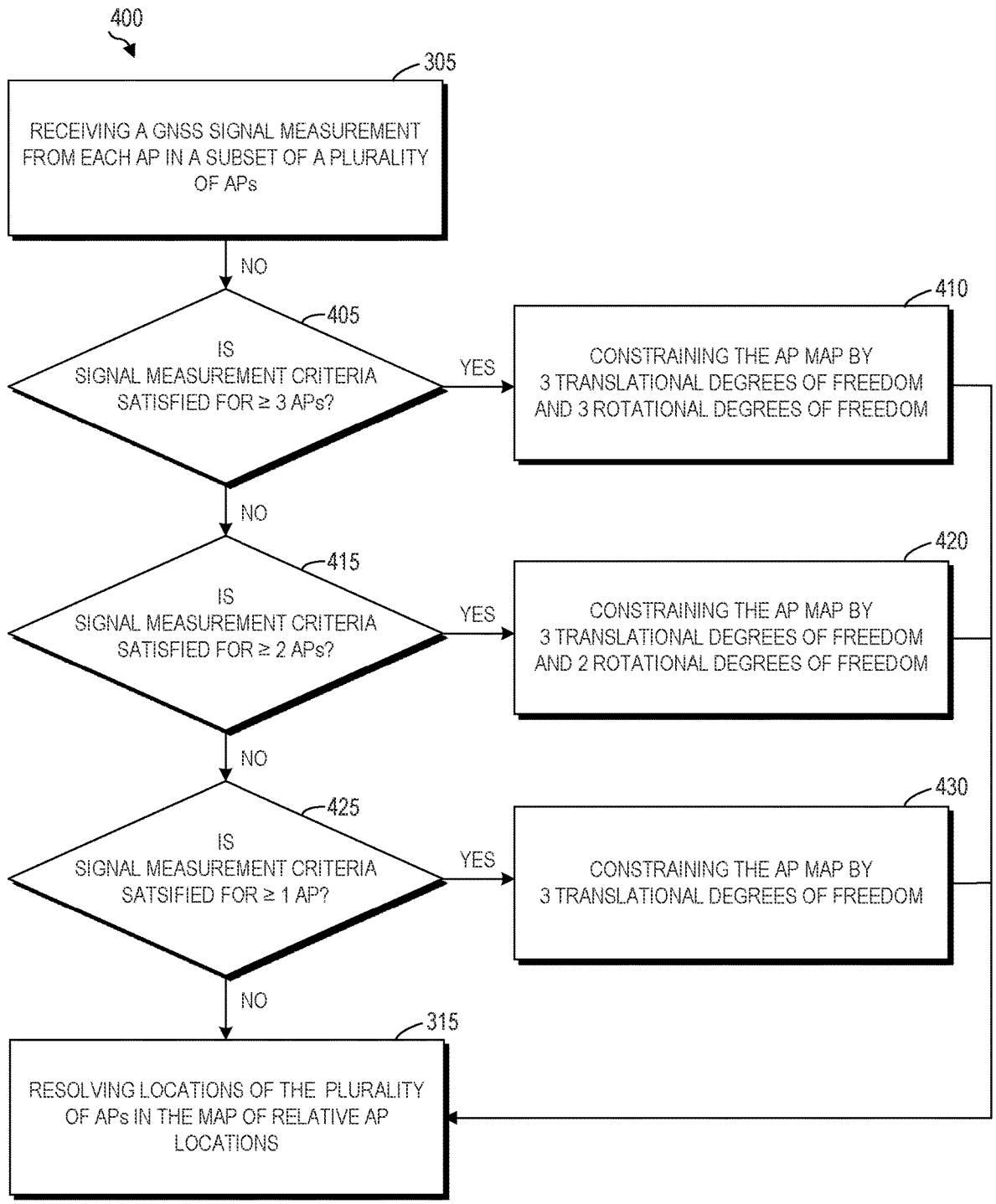
FIG. 4 is a flowchart of an example method for providing automatic location of access points in a network.

FIG. 4 is a flowchart of an example method 400 for automatic location of APs. Although execution of method 400 is described below with reference to computing device 100, other computing devices suitable for the execution of method 400 may be utilized. Additionally, implementation of method 400 is not limited to such examples. While only eight blocks are shown in method 400, method 400 may include other actions described herein. Additionally, although the blocks are shown in an order, blocks depicted in FIG. 4 may be performed in any suitable order and at any time. Moreover, one or more of blocks of method 400 may be performed in combination with one or more blocks of methods 300, 500, 600, or 700. For instance, as shown in FIG. 4, method 400 may include blocks 305 and 315 of method 300. Also, some of the blocks shown in method 400 may be omitted without departing from the spirit and scope of this disclosure.

Referring to FIG. 4, at block 305, GNSS signal measurement receiving instructions 122, when executed by processing resource 110, receive, from each AP in a subset of a plurality of APs, a GNSS signal measurement (as described above in relation to FIG. 3.)

In the example of FIG. 4, at block 405, AP map constraining instructions 124, when executed by processing resource 110, determines whether the GNSS signal measurement received from each AP in the subset of APs satisfies a signal measurement criteria (e.g., as described above in relation to block 310 of method 300). In particular, at block 405, AP map constraining instructions 124 comprise instructions to determine whether the GNSS signal measurement received from at least three APs in the subset of APs satisfy a signal measurement criteria. At block 405, if it is determined that the signal measurement criteria is satisfied for each of at least three APs in the subset of APs, then method 400 proceeds to block 410. At block 405, if it is determined that the signal measurement criteria is not satisfied for each of at least three APs in the subset of APs, then method 400 proceeds to block 415.

In the example of FIG. 4, at block 410, AP map constraining instructions 124 comprise instructions to constrain the map of relative AP locations by three translational degrees of freedom and three rotational degrees of freedom.

In the example of FIG. 4, at block 415, AP map constraining instructions 124, when executed by processing resource 110, determines whether the GNSS signal measurement received from each AP in the subset of APs satisfies a signal measurement criteria (e.g., as described above in relation to block 310 of method 300). In particular, at block 415, AP map constraining instructions 124 comprise instructions to determine whether the GNSS signal measurement received from at least two APs in the subset of APs satisfy a signal measurement criteria. At block 415, if it is determined that the signal measurement criteria is satisfied for each of at least two APs in the subset of APs, then method 400 proceeds to block 420. At block 415, if it is determined that the signal measurement criteria is not satisfied for each of at least two APs in the subset of APs, then method 400 proceeds to block 420.

In the example of FIG. 4, at block 420, AP map constraining instructions 124 comprise instructions to constrain the map of relative AP locations by three translational degrees of freedom and two rotational degrees of freedom.

In the example of FIG. 4, at block 425, AP map constraining instructions 124, when executed by processing resource 110, determines whether the GNSS signal measurement received from each AP in the subset of APs satisfies a signal measurement criteria (e.g., as described above in relation to block 310 of method 300). In particular, at block 425, AP map constraining instructions 124 comprise instructions to determine whether the GNSS signal measurement received from at least one AP in the subset of APs satisfies a signal measurement criteria. At block 425, if it is determined that the signal measurement criteria is satisfied for each of at least one AP in the subset of APs, then method 400 proceeds to block 430. At block 425, if it is determined that the signal measurement criteria is not satisfied for each of at least one AP in the subset of APs, then method 400 proceeds to block 315.

In the example of FIG. 4, at block 430, AP map constraining instructions 124 comprise instructions to constrain the map of relative AP locations by three translational degrees of freedom.

In the example to FIG. 4, at block 315, AP location resolving instructions 126, when executed by processing resource 110, resolve locations of the plurality APs in the map of relative AP locations (as described above in relation to FIG. 3.)

Figure 5:
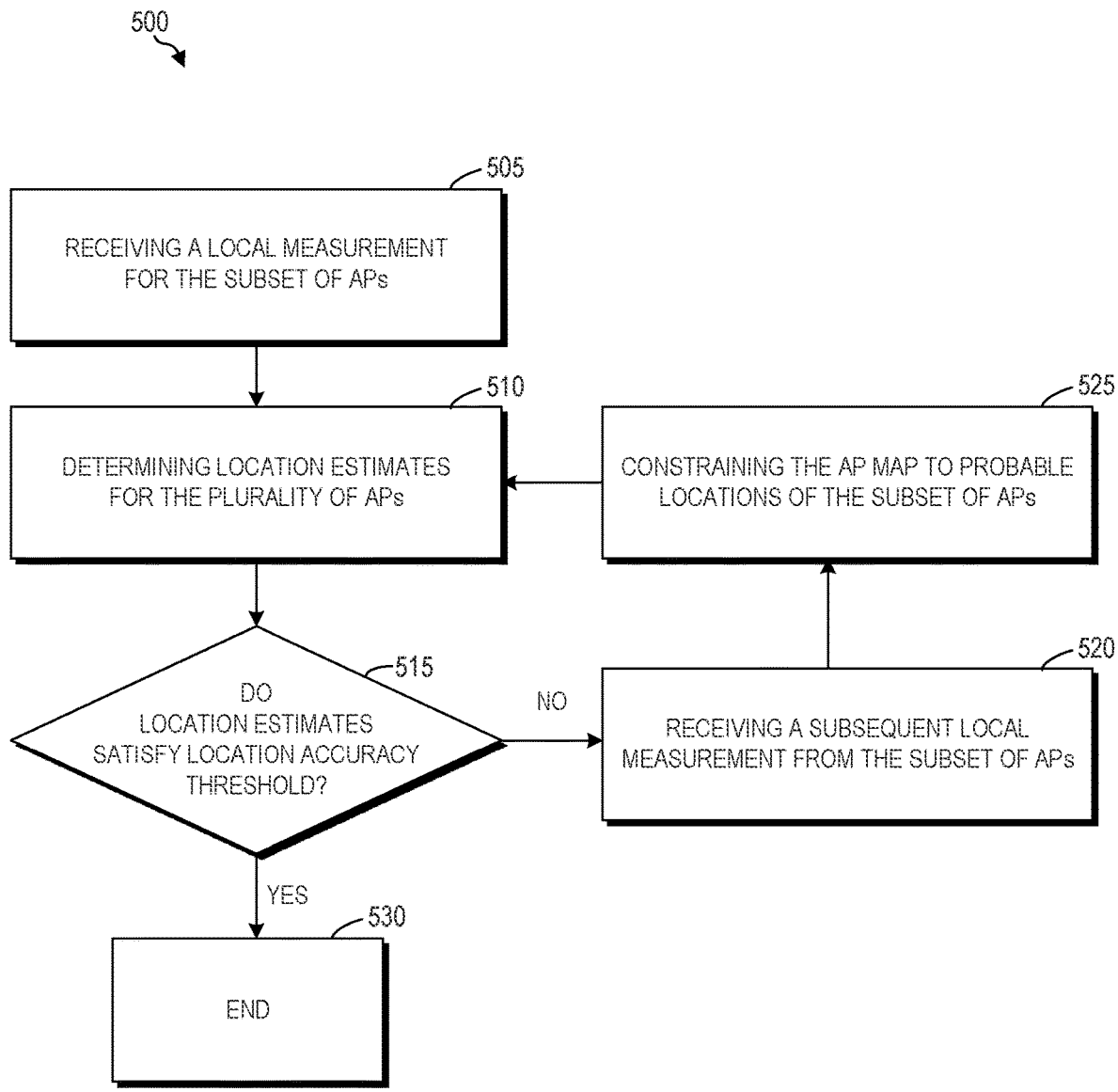
FIG. 5 is a flowchart of an example method for providing automatic location of access points in a network.

FIG. 5 is a flowchart of an example method 500 for automatic location of APs. Although execution of method 500 is described below with reference to computing device 100, other computing devices suitable for the execution of method 500 may be utilized. Additionally, implementation of method 500 is not limited to such examples. While only six blocks are shown in method 500, method 500 may include other actions described herein. Additionally, although the blocks are shown in an order, blocks depicted in FIG. 5 may be performed in any suitable order and at any time. Moreover, one or more of blocks of method 500 may be performed in combination with one or more blocks of methods 300, 400, 600, or 700. Also, some of the blocks shown in method 500 may be omitted without departing from the spirit and scope of this disclosure.

In the example of FIG. 5, at block 505, AP location resolving instructions 126, when executed by processing resource 110, receive a local measurement (i.e., first local measurement) between at least two APs in the subset of APs, wherein the local measurement comprises a fine time measurement (FTM).

In the example of FIG. 5, at block 510, based on the local measurement, AP location resolving instructions 126 comprise instructions to determine location estimates (e.g., first location estimates) for the plurality of APs.

In the example of FIG. 5, at block 515, AP location resolving instructions 126 comprises instructions to determine whether the first location estimates for the plurality of APs satisfy a location accuracy threshold. At block 515, if it is determined that the first location estimates satisfy the location accuracy threshold, then method 500 ends at block 530, i.e., the first location estimates for the plurality of APs resolve the locations of the plurality of APs in the map of relative AP locations. At block 515, if it is determined that the first location estimates do not satisfy the location accuracy threshold, then method 500 proceeds to block 520.

In the example of FIG. 5, at block 520, AP map constraining instructions 124, when executed by processing resource 110, receive a subsequent local measurement (e.g., second local measurement) from the subset of APs.

In the example of FIG. 5, at block 525, AP map constraining instructions 124, when executed by processing resource 110, constrain the map of relative AP locations to probable locations of the subset of APs. After the map of relative AP locations is constrained to the probable locations of the subset of APs, method 500 proceeds (returns) to block 510. For instance, at block 510, AP location resolving instructions 126 comprise instructions to determine subsequent location estimates (e.g., second location estimates, third location estimates, etc.) for the plurality of APs.

Figure 6:
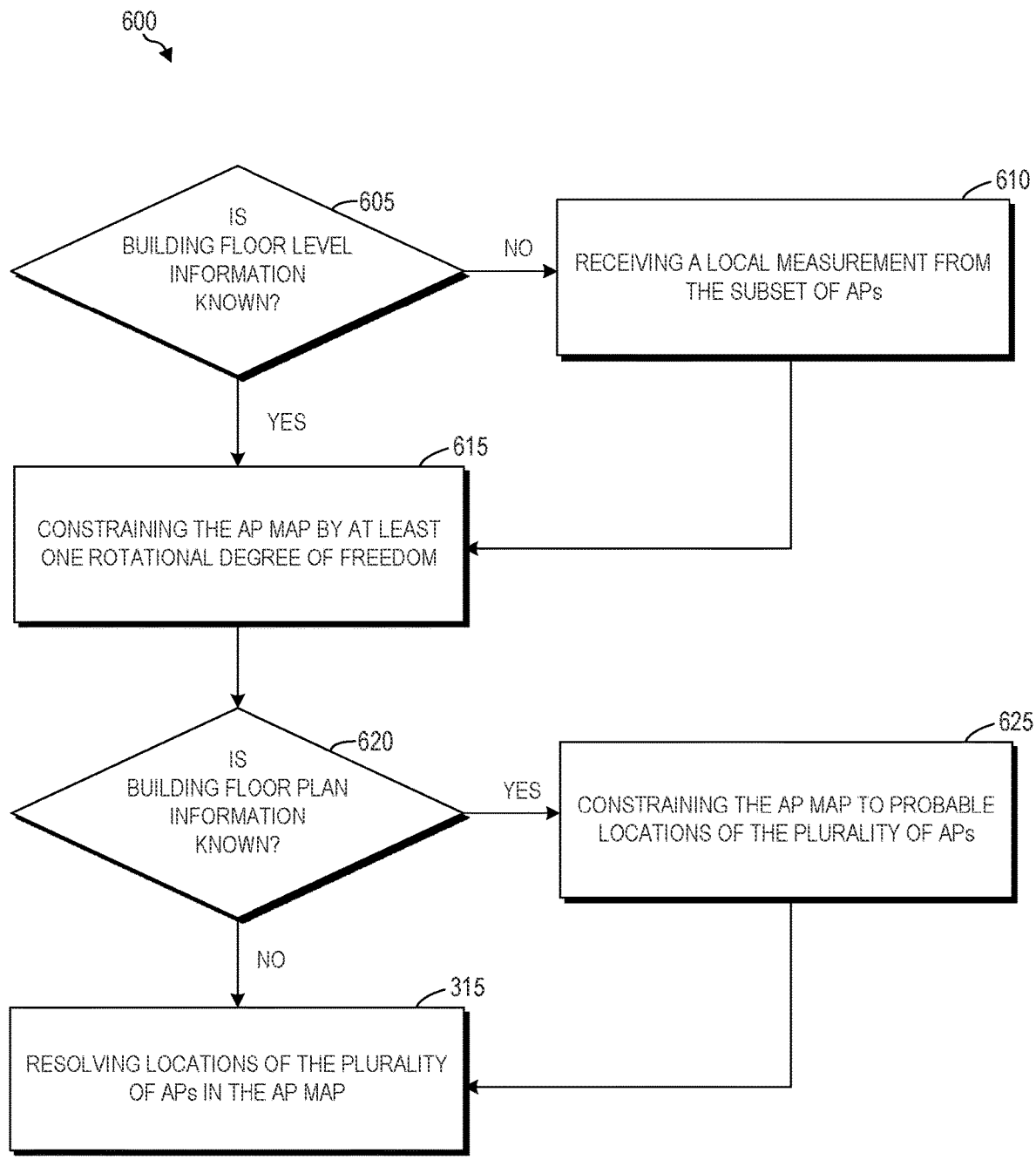
FIG. 6 is a flowchart of an example method for providing automatic location of access points in a network.

FIG. 6 is a flowchart of an example method 600 for automatic location of APs. Although execution of method 600 is described below with reference to computing device 100, other computing devices suitable for the execution of method 600 may be utilized. Additionally, implementation of method 600 is not limited to such examples. While only six blocks are shown in method 600, method 600 may include other actions described herein. Additionally, although the blocks are shown in an order, blocks depicted in FIG. 6 may be performed in any suitable order and at any time. Moreover, one or more of blocks of method 600 may be performed in combination with one or more blocks of methods 300, 400, 500, or 700. For instance, as shown in FIG. 6, method 600 may include block 315 of method 300. Also, some of the blocks shown in method 600 may be omitted without departing from the spirit and scope of this disclosure.

Referring to FIG. 6, at block 605, AP map constraining instructions 124, when executed by processing resource 110, determine whether building floor level information of the plurality of APs is known. At block 605, if it is determined that the building floor level information of the plurality of APs is known, then method 600 proceeds to block 615. At block 605, if it is determined that the building floor level information of the plurality of APs is not known (i.e., unknown), then method 600 proceeds to block 610. Block 605 may be performed based on (e.g., in response to) a determination that the GNSS signal measurements received from at least two APs in the subset of APs satisfy a signal measurement criteria (e.g., at block 415 of method 400). Alternatively, block 605 may be performed based on (e.g., in response to) a determination that the GNSS signal measurements received from at least one AP in the subset of APs satisfies a signal measurement criteria (e.g., at block 425 of method 400). Alternatively, block 605 may be performed based on (e.g., in response to) a determination that the GNSS signal measurement received from each AP in the subset of APs does not satisfy a signal measurement criteria (e.g., at block 425 of method 400, at block 705 of method 700 as described below).

In the example of FIG. 6, at block 610, AP map constraining instructions 124, when executed by processing resource 110, receive a local measurement (e.g., first local measurement) from the subset of APs. The local measurement may be received between at least one AP in the subset of APs and at least one other AP of the plurality of APs. For instance, the local measurement may comprise a FTM, an RSSI measurement, an AoA measurement, or a combination thereof. Alternatively, or in addition, the local measurement may be received for at least one AP in the subset of APs. For instance, the local measurement may comprise a pressure measurement. Based on the local measurement, AP map constraining instructions 124 may comprise instructions to determine the building floor level information for the plurality of APs.

In the example of FIG. 6, at block 615, AP map constraining instructions 124, when executed by processing resource 110, constrain the map of relative AP locations by at least one rotational degree of freedom.

In the example of FIG. 6, at block 620, AP map constraining instructions 124, when executed by processing resource 110, determines whether building floor plan information of the plurality of APs is known. At block 620, if it is determined that the building floor plan information of the plurality of APs is known, then method 600 proceeds to block 625. At block 620, if it is determined that the building floor level information of the plurality of APs is not known, then method 600 proceeds to block 315 (as described above in relation to FIG. 3.)

In the example of FIG. 6, at block 625, AP map constraining instructions 124, when executed by processing resource 110, constrains the map of relative AP locations to probable locations of the plurality of APs. After the map of relative AP locations is constrained by the probable locations of the subset of APs, method 600 proceeds to block 315 (as described above in relation to FIG. 3.)

Figure 7:
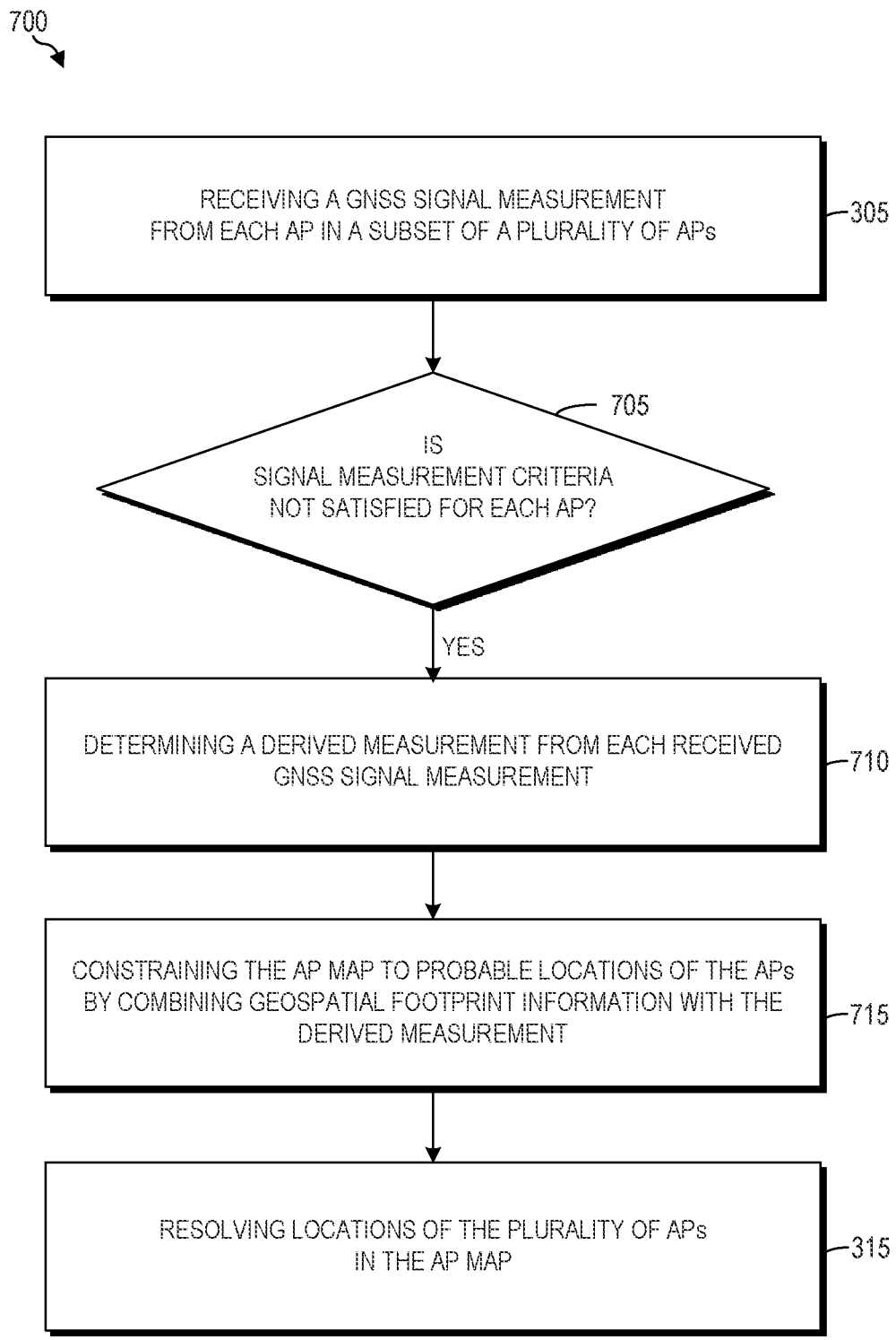
FIG. 7 is a flowchart of an example method for providing automatic location of access points in a network.

FIG. 7 is a flowchart of an example method 700 for automatic location of APs. Although execution of method 700 is described below with reference to computing device 100, other computing devices suitable for the execution of method 700 may be utilized. Additionally, implementation of method 700 is not limited to such examples. While only five blocks are shown in method 700, method 700 may include other actions described herein. Additionally, although the blocks are shown in an order, blocks depicted in FIG. 7 may be performed in any suitable order and at any time. Moreover, one or more of blocks of method 700 may be performed in combination with one or more blocks of methods 300, 400, 500, or 600. For instance, as shown in FIG. 7, method 600 may include blocks 305 and 315 of method 300. Also, some of the blocks shown in method 700 may be omitted without departing from the spirit and scope of this disclosure.

Referring to FIG. 7, at block 305, GNSS signal measurement receiving instructions 122, when executed by processing resource 110, receive, from each AP in a subset of a plurality of APs, a GNSS signal measurement (as described above in relation to FIG. 3.)

In the example of FIG. 7, at block 705, AP map constraining instructions 124, when executed by processing resource 110, determines whether the GNSS signal measurement received from each AP in the subset of APs satisfies a signal measurement criteria (e.g., as described above in relation to block 310 of method 300). In particular, at block 705, AP map constraining instructions 124 comprise instructions to determine whether the GNSS signal measurement received from each AP in the subset of APs does not satisfy the signal measurement criteria. At block 705, if it is determined that the signal measurement criteria is not satisfied for each AP in the subset of APs, then method 700 proceeds to block 710. At block 705, if it is determined that the signal measurement criteria is satisfied for each of at least one AP in the subset of APs, then method 700 may proceed to one or more of blocks 405 (not shown), 415 (not shown), or 425 (not shown) of method 400.

In the example of FIG. 7, at block 710, AP map constraining instructions 124, when executed by processing resource, determine a derived measurement from the GNSS measurement received from each AP in the subset of APs. For instance, the derived measurement may comprise satellite orbital information, a building entry loss estimate, a received power, or a combination thereof.

In the example of FIG. 7, at block 715, AP map constraining instructions 124, when executed by processing resource, constrain the map of relative AP locations to probable locations of the subset of APs by combining geospatial building footprint information with the derived measurement.

In the example of FIG. 7, at block 315, AP location resolving instructions 126, when executed by processing resource 110, resolve locations of the plurality APs in the map of relative AP locations (as described above in relation to FIG. 3.)

Figure 8:
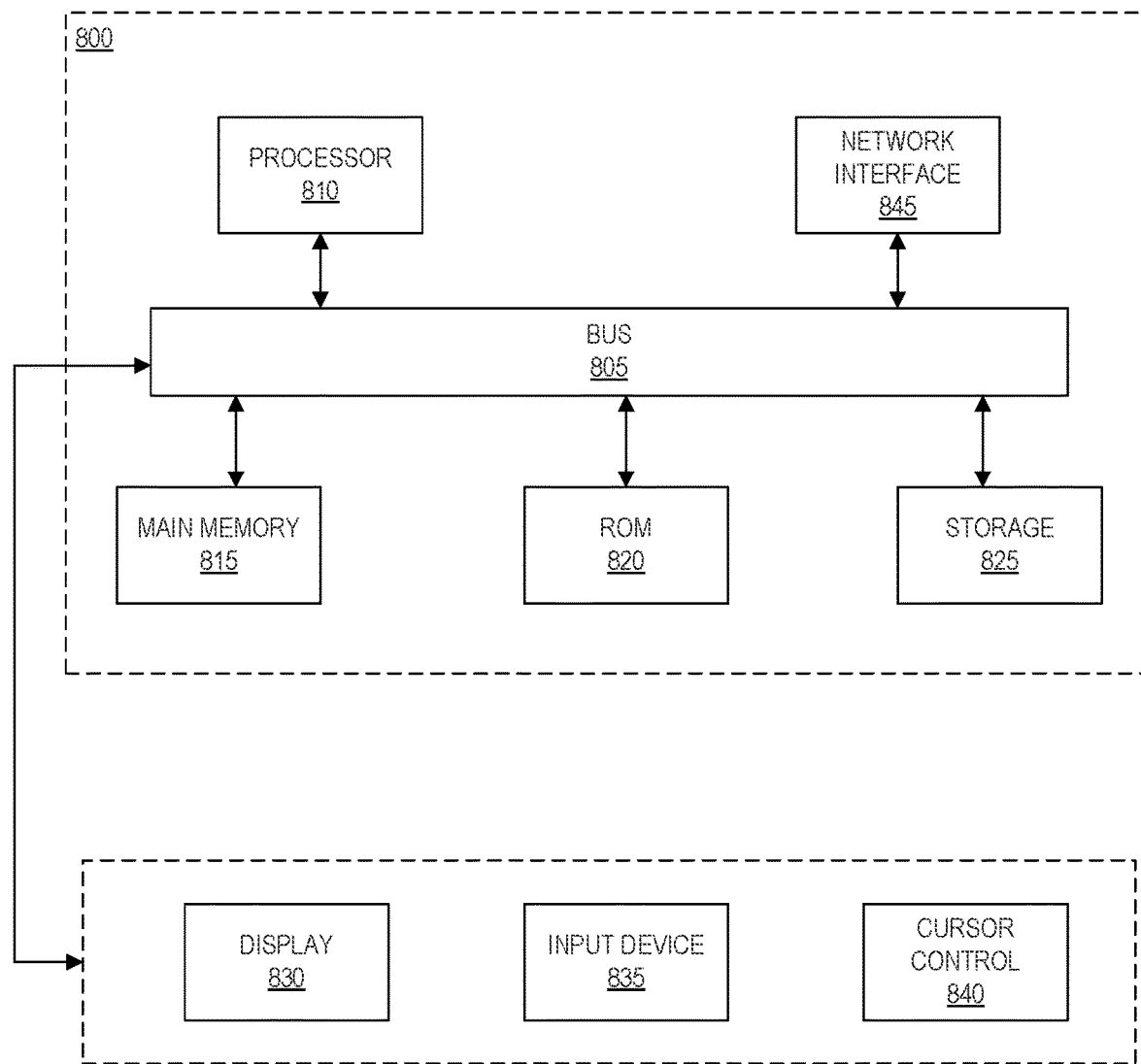
FIG. 8 is a block diagram of an example computer system in which various embodiments described herein may be implemented for providing automatic location of access points in a network.

FIG. 8 is a block diagram of an example computer system 800 in which various embodiments described herein may be implemented for automatic location of access points.

Computer system 800 includes bus 805 or other communication mechanism for communicating information, at least one hardware processor 810 coupled with bus 805 for processing information. At least one hardware processor 810 may be, for example, at least one general purpose microprocessor.

Computer system 800 also includes main memory 815, such as random access memory (RAM), cache, other dynamic storage devices, or the like, or a combination thereof, coupled to bus 805 for storing information and one or more instructions to be executed by at least one processor 810. Main memory 815 also may be used for storing temporary variables or other intermediate information during execution of one or more instructions to be executed by at least one processor 810. In some examples, the one or more instructions comprise one or more of GNSS signal measurement receiving instructions 122, AP map constraining instructions 124, and AP location resolving instructions 126, as described above in relation FIGS. 1-7. Such one or more instructions, when stored on storage media accessible to at least one processor 810, render computer system 800 into a special-purpose machine that is customized to perform the operations specified in the one or more instructions.

Computer system 800 may further include read only memory (ROM) 820 or other static storage device coupled to bus 805 for storing one or more instructions to be executed by at least one processor 810. In some examples, the one or more instructions comprise one or more of GNSS signal measurement receiving instructions 122, AP map constraining instructions 124, and AP location resolving instructions 126, as described above in relation to FIGS. 1-7 above. Such one or more instructions, when stored on storage media accessible to at least one processor 810, render computer system 800 into a special-purpose machine that is customized to perform the operations specified in the one or more instructions.

Computer system 800 may further include information and one or more instructions for at least one processor 810. At least one storage device 825, such as a magnetic disk, optical disk, or USB thumb drive (Flash drive), or the like, or a combination thereof, may be provided and coupled to bus 805 for storing information and one or more instructions. In some examples, the one or more instructions comprise one or more of GNSS signal measurement receiving instructions 122, AP map constraining instructions 124, and AP location resolving instructions 126, as described above in relation to FIGS. 1-7.

Computer system 800 may further include display 830 coupled to bus 805 for displaying a graphical output to a user. The computer system 800 may further include input device 835, such as a keyboard, camera, microphone, or the like, or a combination thereof, coupled to bus 805 for providing an input from a user. Computer system 800 may further include cursor control 840, such as a mouse, pointer, stylus, or the like, or a combination thereof, coupled to bus 805 for providing an input from a user.

Computer system 800 may further includes at least one network interface 845, such as a network interface controller (NIC), network adapter, or the like, or a combination thereof, coupled to bus 805 for connecting computer system 800 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 based on (e.g., in response to) at least one processor 810 executing one or more sequences of one or more instructions contained in main memory 815. Such one or more instructions may be read into main memory 815 from another storage medium, such as at least one storage device 825. Execution of the sequences of one or more instructions contained in main memory 815 causes at least one processor 810 to perform the process steps described herein. In alternative embodiments, hard-wired circuitry may be used in place of or in combination with software instructions.

In examples described herein, the term "Wi-Fi" is meant to encompass any type of wireless communications that conforms to any IEEE 802.11 standards, whether 802.11ac, 802.11ax, 802.11a, 802.11n, 802.11ad, 802.11ay, etc. The term "Wi-Fi" is currently promulgated by the Wi-Fi Alliance®. Any products tested and approved as "Wi-Fi Certified" (a registered trademark) by the Wi-Fi Alliance® are certified as interoperable with each other, even if they are from different manufacturers. A user with a "Wi-Fi Certified" (a registered trademark) product can use any brand of WAP with any other brand of client hardware that also is certified. Typically, however, any Wi-Fi product using the same radio frequency band (e.g., 60 GHz band for 802.11ad or 802.11ay) will work with any other, even if such products are not "Wi-Fi Certified." The term "Wi-Fi" is further intended to encompass future versions and/or variations on the foregoing communication standards. Each of the foregoing standards is hereby incorporated by reference.

In examples described herein, the term "non-transitory media," and similar terms, refers to any electronic, magnetic, optical, or other physical storage device that contains or stores executable instructions. Non-transitory media may comprise non-volatile media and/or volatile media. Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method for resolving locations of a plurality of access points (APs) in a map of relative AP locations, comprising:
   receiving, by a computing device from a first subset of APs in the plurality of APs, a Global Navigation Satellite System (GNSS) signal measurement and parameters of the GNSS signal measurement, the parameters comprising a GNSS type, signal strength, frequency, bandwidth, data rate, and modulation scheme;
   determining that, by the computing device, a first location estimate for an AP of the first subset of APs exceeds a location accuracy threshold, the location accuracy threshold corresponding to at least one of the parameters of the GNSS signal measurement;
   removing, by the computing device, the AP from the first subset to provide a second subset of APs based on the determination that the first location estimate exceeds the location accuracy threshold;
   based on the received GNSS signal measurement of the second subset of APs, initiating a first constraining process, by the computing device, the map of relative AP locations by at least one translational degree of freedom or one rotational degree of freedom;
   resolving, by the computing device, locations of the plurality of APs in the map of relative AP locations;
   determining, by the computing device, second location estimates for the plurality of APS;
   initiating, by the computing device, a second constraining process that constrains the map of relative AP locations to probable locations of the second subset of APs, wherein the second constraining process removes the first location estimate that exceeds a threshold level of difference between the first location estimate and the second location estimates; and
   in response to the second constraining process, determining, by the computing device, anchor points from the second location estimates for the plurality of APs.

2. The method of claim 1, wherein constraining the map of relative AP locations comprises:
   determining, by the computing device for each AP in the second subset of APs, whether the GNSS signal measurement received from the AP satisfies a signal measurement criteria; and
   based on determining that for each of at least one AP in the second subset of APs, the GNSS signal measurement received from the AP satisfies the signal measurement criteria, constraining by the first constraining process the map of relative AP locations by three translational degrees of freedom.

3. The method of claim 1, wherein constraining the map of relative AP locations comprises:
   determining, by the computing device for each AP in the second subset of APs, whether the GNSS signal measurement received from the AP satisfies a signal measurement criteria; and
   based on determining that for each of at least two APs in the second subset of APs, the GNSS signal measurement received from the AP satisfies the signal measurement criteria, constraining by the first constraining process the map of relative AP locations by three translational degrees of freedom and two rotational degrees of freedom.

4. The method of claim 1, wherein constraining the map of relative AP locations comprises:
   determining, by the computing device for each AP in the second subset of APs, whether the GNSS signal measurement received from the AP satisfies a signal measurement criteria; and
   based on determining that for each of at least three APs in the second subset of APs, the GNSS signal measurement received from the AP satisfies the signal measurement criteria, constraining by the first constraining process the map of relative AP locations by three translational degrees of freedom and three rotational degrees of freedom.

5. The method of claim 1, wherein resolving the locations of the plurality of APs comprises:
   receiving, by the computing device, a first local measurement between at least two APs in the second subset of APs, wherein the first local measurement comprises a fine time measurement (FTM); and
   based on the first local measurement, determining, by the computing device, first location estimates for the plurality of APs.

6. The method of claim 5, wherein resolving the locations of the plurality of APs comprises:
   determining, by the computing device, whether the first location estimates for the plurality of APs satisfy the location accuracy threshold,
   wherein the second location estimates for the plurality of APs are determined based on whether the first location estimates satisfy the location accuracy threshold.

7. The method of claim 6, wherein determining the second location estimates for the plurality of APs comprises:
   receiving, by the computing device, a second local measurement between at least two APs in the second subset of APs, wherein the second local measurement comprises an FTM, a received signal strength indicator (RSSI) measurement, an angle-of-arrival (AoA) measurement, or a combination thereof; and
   using the second local measurement in the second constraining process.

8. The method of claim 6, wherein determining the second location estimates for the plurality of APs comprises:
   receiving, by the computing device, a second local measurement for at least one AP in the second subset of APs, wherein the second local measurement comprises a pressure measurement;
   using the second local measurement in the second constraining process.

9. The method of claim 6, wherein determining the second location estimates for the plurality of APs comprises:
   determining, by the computing device, building floor plan information for the plurality of APs;
   based on the building floor plan information, constraining, by the computing device, the map of relative AP locations to probable locations of the second subset of APs; and
   based on constraining the map of relative AP locations to the probable locations of the second subset of APs, determining, by the computing device, the second location estimates for the plurality of APs.

10. The method of claim 1, wherein constraining the map of relative AP locations comprises:
    determining, by the computing device, building floor level information for the plurality of APs; and
    based on the building floor level information, constraining, by the computing device, the map of relative AP locations by at least one rotational degree of freedom.

11. The method of claim 10, wherein determining the building floor level information for the plurality of APs comprises:
    receiving, by the computing device, a first local measurement between at least one AP in the second subset of APs and at least one other AP of the plurality of APs, wherein the first local measurement comprises a fine time measurement (FTM), a received signal strength indicator (RSSI) measurement, an angle-of-arrival (AoA) measurement, or a combination thereof; and
    based on the first local measurement, determining, by the computing device, the building floor level information for the plurality of APs.

12. The method of claim 10, wherein determining the building floor level information for the plurality of APs comprises:
    receiving, by the computing device, a first local measurement for at least one AP in the second subset of APs, wherein the first local measurement comprises a pressure measurement; and
    based on the first local measurement, determining, by the computing device, the building floor level information for the plurality of APs.

13. The method of claim 1, wherein constraining the map of relative AP locations comprises:
    determining, by the computing device for each AP in the first subset of APs, whether the GNSS signal measurement received from the AP satisfies a signal measurement criteria;
    based on determining that for each AP in the first subset of APs, the GNSS signal measurement received from the AP does not satisfy the signal measurement criteria, determining, by the computing device, a derived measurement from the GNSS measurement received from each AP in the first subset of APs, wherein the derived measurement comprises satellite orbital information, a building entry loss estimate, a received power, or a combination thereof; and
    constraining, by the computing device, the map of relative AP locations to probable locations of the first subset of APs by combining geospatial building footprint information with the derived measurement.

14. The method of claim 13, wherein resolving the locations of the plurality of APs comprises:
    based on constraining the map of relative AP locations to the probable locations of the first subset of APs, determining, by the computing device, first location estimates for the plurality of APs.

15. The method of claim 1, wherein the location accuracy threshold is a threshold difference between location estimates, wherein determining the first location estimate for an AP of the first subset of APs exceeds a location accuracy threshold comprises:
    determining an initial location estimate for the AP from a GNSS signal measurement;
    determining the first location estimate based on a first local measurement between the AP in the first subset of APs and at least one other AP of the plurality of APs; and
    determining a difference between the initial location estimate and the first location estimate exceeds the threshold difference between location estimates.

16. A computing device, comprising:
    a processing resource; and
    a non-transitory machine-readable storage medium comprising instructions executable by the processing resource to:
        receive, from a first subset of a plurality of network devices, a Global Navigation Satellite System (GNSS) signal measurement and parameters of the GNSS signal measurement, the parameters comprising a GNSS type, signal strength, frequency, bandwidth, data rate, and modulation scheme;
        determine that a first location estimate for a network device of the first subset of network devices exceeds a location accuracy threshold, the location accuracy threshold corresponding to at least one of the parameters of the GNSS signal measurement;
        remove the network device from the first subset to provide a second subset of network devices based on the determination that the first location estimate exceeds the location accuracy threshold;
        based on the GNSS signal measurement of the second subset of network devices, constrain a map of relative network device locations by at least one translational degree of freedom or one rotational degree of freedom;
        resolve locations of the plurality of network devices in the map of relative network device locations;
        determine second location estimates for the plurality of network devices;
        initiate a second constraining process that constrains the map of relative network device locations to probable locations of the second subset of network devices, wherein the second constraining process removes the first location estimate that exceeds a threshold level of difference between the first location estimate and the second location estimates; and
        in response to the second constraining process, determine anchor points from the second location estimates for the plurality of network devices.

17. A system, comprising:
    the computing device of claim 16; and
    the first subset of network devices, wherein each network device in the first subset of network devices comprises:
        a GNSS receiver;
        a processing resource; and
        a non-transitory machine-readable storage medium comprising instructions executable by at least one processing resource to:
            receive, by the GNSS receiver, a GNSS signal;
            based on the received GNSS signal, determine the GNSS signal measurement for the network device; and
            transmit, to the computing device, the GNSS signal measurement for the network device.

18. The system of claim 17, wherein each network device in the first subset of network devices comprises an AP.

19. The system of claim 17, wherein at least one of the network devices in the first subset of network devices comprises a client device.

20. The computing device of claim 16, wherein the instructions further cause the processing resource to:
    receive, with the GNSS signal measurement and by the computing device, a dilution of precision or satellite geometry of signals used in determining the first location estimate for the network device;

based on the dilution of precision or the satellite geometry of signals, determine a level of error in the first location estimate for the network device and azimuths and elevations associated with the AP; and based on a determination of the level of error in the first location estimate for the network device and the azimuths and the elevations associated with the AP, determine information about where the network device is located within a structure whose boundaries and materials are known.

21. An article comprising at least one non-transitory machine-readable storage medium comprising instructions executable by at least one processing resource to:

receive, by a computing device from a first subset of a plurality of access points (APs), a Global Navigation Satellite System (GNSS) signal measurement and parameters of the GNSS signal measurement, the parameters comprising a GNSS type, signal strength, frequency, bandwidth, data rate, and modulation scheme;

determine that, by the computing device, a first location estimate for an AP of the first subset of APs exceeds a location accuracy threshold, the location accuracy threshold corresponding to at least one of the parameters of the GNSS signal measurement;

removing, by the computing device, the AP from the first subset to provide a second subset of APs based on the determination that the first location estimate exceeds the location accuracy threshold;

based on the received GNSS signal measurement of the second subset of APs, constrain, by the computing device, a map of relative AP locations by at least one translational degree of freedom or one rotational degree of freedom;

resolve, by the computing device, locations of the plurality of APs in the map of relative AP locations;

determine, by the computing device, second location estimates for the plurality of APs;

initiate a second constraining process that constrains the map of relative AP locations to probable locations of the second subset of APs, wherein the second constraining process removes the first location estimate that exceeds a threshold level of difference between the first location estimate and the second location estimates; and in response to the second constraining process, determine, by the computing device, anchor points from the second location estimates for the plurality of APs.

\* \* \* \* \*